(12) United States Patent
Zollinger et al.

(10) Patent No.: US 8,782,420 B2
(45) Date of Patent: Jul. 15, 2014

(54) SYSTEM AND METHOD FOR OBFUSCATION INITIATION VALUES OF A CRYPTOGRAPHY PROTOCOL

(75) Inventors: Mitch Zollinger, San Jose, CA (US); Filip Paun, Menlo Park, CA (US)

(73) Assignee: Netflix, Inc, Los Gatos, CA (US)

( * ) Notice: Subject to any disclaimer, the term of this patent is extended or adjusted under 35 U.S.C. 154(b) by 231 days.

(21) Appl. No.: 13/189,437

(22) Filed: Jul. 22, 2011

(65) Prior Publication Data

US 2013/0024697 A1    Jan. 24, 2013

(51) Int. Cl.
*H04L 9/32* (2006.01)
*H04L 9/08* (2006.01)

(52) U.S. Cl.
CPC .............. *H04L 9/3247* (2013.01); *H04L 9/085* (2013.01); *H04L 2209/16* (2013.01)
USPC .......................................................... 713/176

(58) Field of Classification Search
CPC .... H04L 9/3247; H04L 9/085; H04L 2209/16
USPC .......................................................... 713/176
See application file for complete search history.

(56) References Cited

U.S. PATENT DOCUMENTS

| | | | |
|---|---|---|---|
| 6,298,153 B1* | 10/2001 | Oishi | 382/186 |
| 2008/0137848 A1* | 6/2008 | Kocher et al. | 380/201 |
| 2008/0147555 A1 | 6/2008 | Cromer et al. | |
| 2009/0006862 A1 | 1/2009 | Alkove et al. | |
| 2009/0285386 A1 | 11/2009 | Takashima | |
| 2010/0199089 A1 | 8/2010 | Vysogorets et al. | |

OTHER PUBLICATIONS

PCT/US2012/047448 International Search Report dated Sep. 28, 2012.

* cited by examiner

*Primary Examiner* — Ashok Patel
*Assistant Examiner* — Lawrence Cosby
(74) *Attorney, Agent, or Firm* — Patterson & Sheridan, LLP (57) ABSTRACT

A computer-implemented technique for determining whether a first computing device has the correct version of a software program may be used to provide a secure approach to verifying that a client computing device has a secure and approved version of content player software implemented for consuming downloaded copyright media content. With this technique, copyright media content providers are able to ensure that only secure and approved content players are implemented to access the content.

12 Claims, 8 Drawing Sheets

SYSTEM AND METHOD FOR OBFUSCATION INITIATION VALUES OF A CRYPTOGRAPHY PROTOCOL

BACKGROUND OF THE INVENTION

1. Field of the Invention

The present invention relates generally to cryptography in computer networks and, more specifically, to a system and method to check whether a computer device runs the correct version of a software program based on obfuscated initiation values of a cryptography protocol.

2. Description of the Related Art

Content player software configured to run on client computing devices is typically fairly complex. Oftentimes, security flaws in the content player software are discovered after the software is released and downloaded by many client computing devices. Such security flaws may result in copyrighted content being viewed or copied by end-users or others without proper authorization. To remedy such security flaws, the client content player software is updated to a new version that is designed to address the security flaws, and a client computing device is not able to download copyrighted content until the client computing device verifies the new version of the content player software has been loaded properly onto the device.

Typically, each version of the content player software is represented by a different version number. The version number of the content player software currently residing on the client computing device is stored in a memory on the client computing device that is associated with the content player software. One drawback of this approach is that the end-user of a client computer can easily "hack" the content player software and change the version number without downloading a new version of the content player software corresponding to the modified version number and developed to address one or more security flaws in the old version of the content player software. As a result, the end-user of the client computing device may be able to avoid DRM and other copy protections implemented by the content provider and exposed through the one or more security flaw in the content player software.

As the foregoing illustrates, what is needed in the art is a more secure approach to verifying that an application currently installed on a client device is secure.

SUMMARY OF THE INVENTION

One embodiment of the invention sets forth a computer-implemented method for determining whether a first computing device has the correct version of a software program. The system includes two computing devices initialized with the same one or more initial value. The method includes computing a private secret value based on at least one initial setup value, computing a public value based on the private secret value and at least one initial setup value, sending the computed public value to the second computing device, receiving another public value from the second computing device, and computing a shared secret based on the public value received from the second computing device and the private secret value. The method also includes receiving an encrypted message from the second computing device, decrypting the encrypted message using the shared secret, and determining whether the message was decrypted correctly. If the message was decrypted correctly, then communications between the first computing device and the second computing device continue because the first computing device has the correct version of the software program. However, if the message was not decrypted correctly, then communications between the first computing device and the second computing device terminate because the first computing device does not have the correct version of the software program.

One advantage of the disclosed method is that the method provides a secure approach to verifying that a client computing device has a secure and approved version of content player software implemented for consuming downloaded copyright media content. As a result, copyright media content providers are able to ensure that only secure and approved content players are implemented to access the content.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
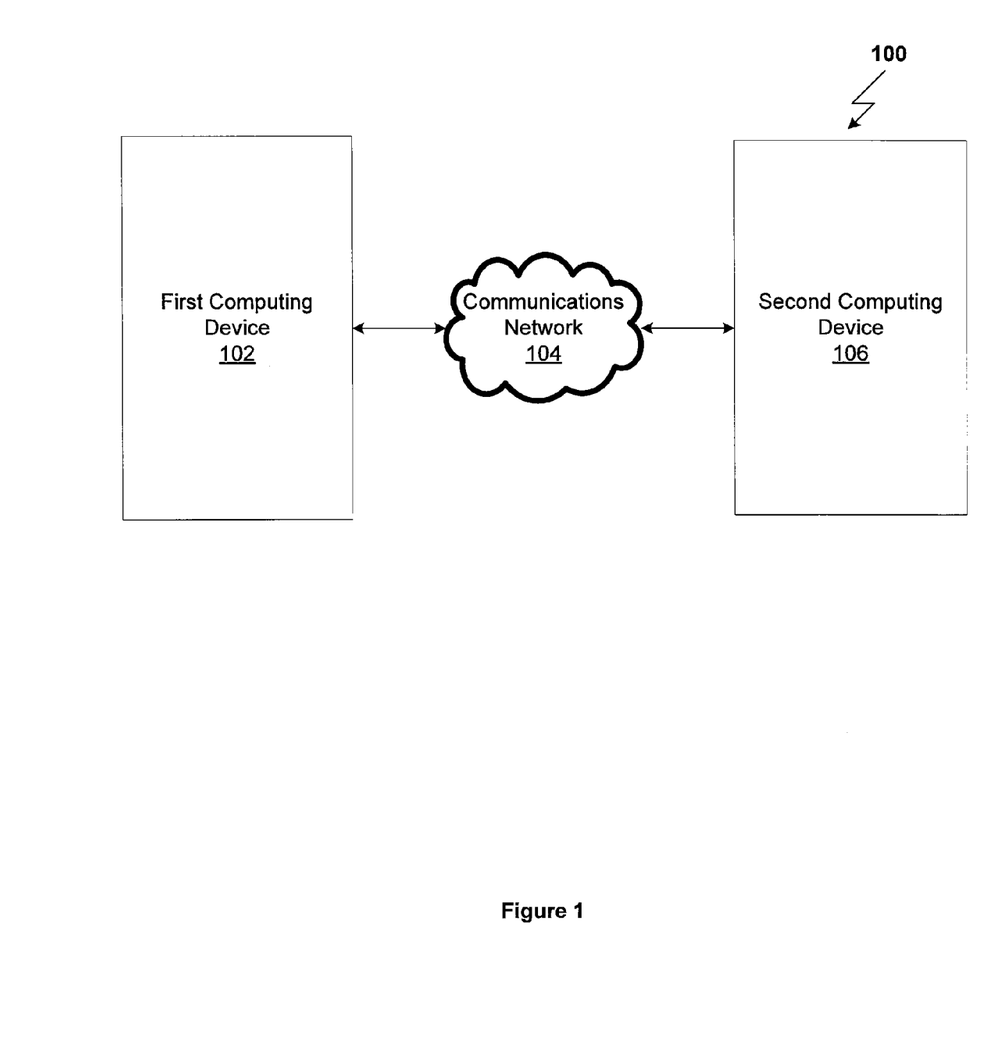
FIG. 1 illustrates a computer network configured to implement one or more aspects of the present invention.

FIG. 1 illustrates a computer network 100 configured to implement one or more aspects of the present invention. As shown, the computer network 100 includes a first computing device 102, a communications network 104, and a second computing device 106.

The first computing device 102 and the second computing device 106 are any two computing devices that communicate data. In one embodiment, the first computing device 102 is an end-user computing device, such as a desktop computer, a laptop computer, a mobile phone, a personal digital assistant (PDA) or any other device configured to communicate data via a communications network 104. In one embodiment, the second computing device 106 is a server storing media content, such as audio or video data. In one embodiment, the second computing device 106 is a server in a content distribution network (CDN). However, persons skilled in the art would recognize that the first computing device 102 and the second computing device 106 may be any two computing devices that communicate with one another. According to one embodiment, the communications network 104 is the Internet.

Figure 2:
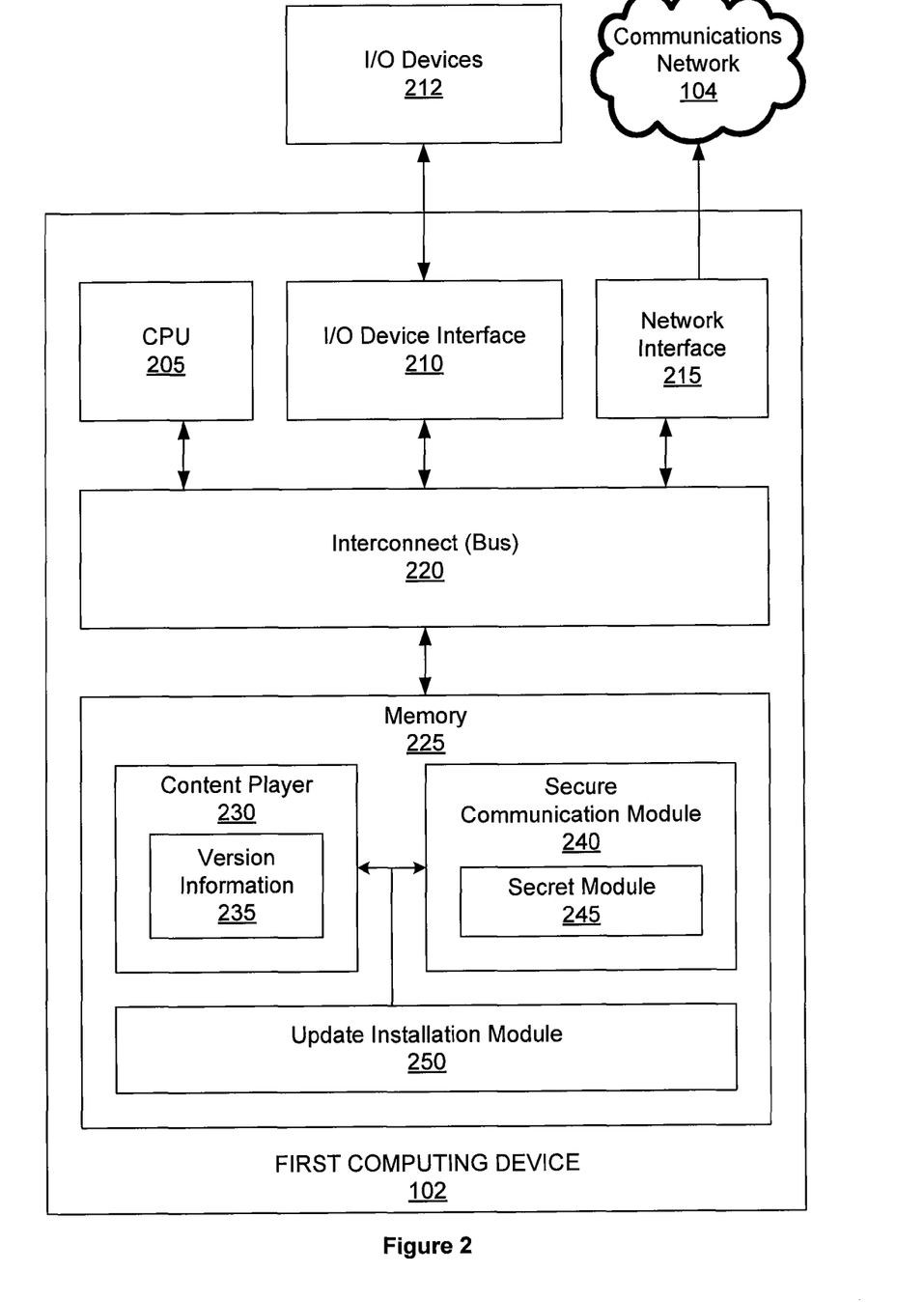
FIG. 2 is a more detailed illustration of the first computing device of FIG. 1, according to one embodiment of the present invention.

FIG. 2 is a more detailed illustration of the first computing device 102 of FIG. 1, according to one embodiment of the present invention. As shown, the first computing device 102 includes, a central processing unit (CPU) 205, a network interface 215, an interconnect 220, and a memory 225. The first computing device 102 may also include an input/output (I/O) devices interface 210 connecting I/O devices 212 (e.g., keyboard, display and mouse devices) to the first computing device 102.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. The memory 225 includes random access memory (RAM), a hard disk drive and/or a flash memory storage drive.

As shown, the memory 225 includes a content player 230, a secure communication module 240, and an update installation module 250. In one embodiment, the content player 230 is a media player configured to present audio or video data to the end-user of the first computing device 102. The secure communication module 240 includes software that, when executed, causes the first computing device 102 to engage in encrypted communication with another computing device, such as second computing device 106, via the communications network 104. The update installation module 250 includes software that, when executed, causes the content player 230 and the secure communication module 240 to update.

As shown, the content player 230 includes version information 235. The version information 235 stores information representing the current version of the software of content player 230. In one embodiment, the version information 235 includes a version number. In another embodiment, the version information 235 includes the date and time when the software of content player 230 was last modified.

As shown, the secure communication module 240 includes a secret module 245. In one embodiment, the secret module 245 is an obfuscated module that includes data that cannot be read or modified by the end-user of the first computing device 102. A more detailed discussion of the operation of the secret module 245, according to one embodiment, is provided in conjunction with the discussion of FIG. 3 below. In one embodiment, the update installation module 250 also updates the version information 235 of the content player 230 and the secret module 245 of the secure communication module 240 to ensure that the secret module 245 corresponds to the version information 235.

In one embodiment, the content player 230 and the secure communication module 240 are always updated together. Therefore, whenever the version information 235 of the content player 230 is updated, the secret module 245 of the secure communication module 240 is also updated.

Figure 3:
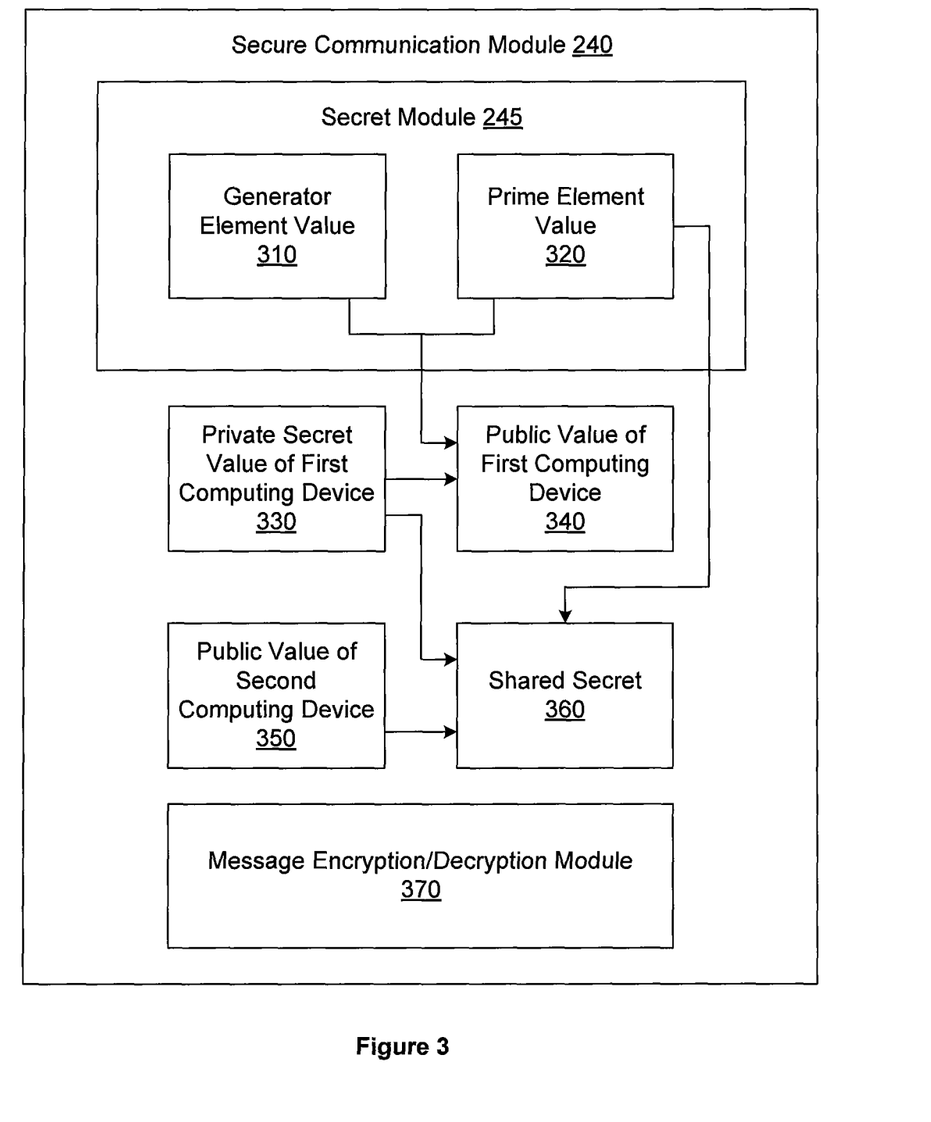
FIG. 3 is a more detailed illustration of the secure communication module in the first computing device of FIG. 2, according to one embodiment of the present invention.

FIG. 3 is a more detailed illustration of the secure communication module 240 in the first computing device 102 of FIG. 2, according to one embodiment of the present invention. As shown, the secure communication module 240 includes the secret module 245, a private secret value of the first computing device 330, a public value of the first computing device 340, a public value of the second computing device 350, a shared secret 360, and a message encryption/decryption module 370.

The secret module 245 includes a generator element value 310 and a prime element value 320. Persons skilled in the art would recognize that such values are required to implement cryptographic algorithms, such as a key exchange algorithm, e.g. the Diffie-Hellman key exchange algorithm, or an encryption algorithm, e.g. the ElGamal encryption algorithm, or the digital signature algorithm (DSA). In one embodiment the values in the secret module 245, generator element value 310 and prime element value 320, correspond to a particular version information 235 of content player 230. In other words, whenever the version information 235 of content player 230 is updated, the generator element value 310 and prime element value 320 are also updated. Such a technique ensures that the secret module 245 corresponds to the version information 235. In one embodiment, the generator element value 310 is relatively prime to the prime element value 320 minus 1. In one embodiment, the generator element value 310 includes more bits than a first threshold number and has less than a second threshold number of bits that are set to 1 in order to facilitate fast binary calculations with the generator element value 310, such that the generator element value 310 is difficult to obtain via trial-and-error. In one embodiment, the prime element value 320 is larger than a third threshold number, such that the following value are difficult to obtain via trial-and-error: prime element value 320, public value 340, public value 350 and shared secret 360. However, persons skilled in the art would recognize that any generator element value 310 and prime element value 320 that is valid according to the encryption algorithm, key exchange algorithm or signature algorithm may be implemented in conjunction with the techniques described herein.

According to one embodiment, where the cryptography algorithm being implemented is a key exchange algorithm, and, more specifically, the Diffie-Hellman key exchange algorithm, the private secret value of the first computing device 330 is selected by the secure communication module 240. The private secret value of the first computing device 330 is a number between one and one less than the prime element value 320. As illustrated, the public value of the first computing device 340 is determined from the generator element value 310, the prime element value 320, and the private secret value of the first computing device 330. The public value of the first computing device 340 is sent over the communication network 104 to the second computing device 106. Where the key exchange algorithm being implemented is the Diffie-Hellman key exchange algorithm, the public value of the first computing device 340 is calculated according to Equation (1):

$$A = g^a \bmod p \qquad (1)$$

Where A is the public value of the first computing device 340, a is the private secret value of the first computing device 330, g is the generator element value 310, and p is the prime element value 320.

In one embodiment, the secure communication module 240 further stores the public value of the second computing device 350. In one embodiment, the public value of the second computing device 350 is received over the communications network 104 from the second computing device 106. In addition, in one embodiment, the secure communication module 240 further stores a shared secret 360. As illustrated, the shared secret 360 is calculated based on the prime element value 320, the private secret value of the first computing device 330, and the public value of the second computing device 350. According to one embodiment, where the key exchange algorithm being implemented is the Diffie-Hellman key exchange algorithm, the shared secret 360 is calculated according to Equation (2):

$$s = B^a \bmod p \qquad (2)$$

Where s is the shared secret 360, B is the public value of the second computing device 350, a is the private secret value of the first computing device 330, and p is the prime element value 320.

However, as persons skilled in the art would understand, cryptography algorithms other than Diffie-Hellman key exchange algorithm could be used in conjunction with the techniques described herein. If a cryptography algorithm other than Diffie-Hellman key exchange algorithm is used, then the formulas for calculating the public value of the first computing device 340 and the shared secret 360 would be different from Equations (1)-(2) set forth above.

The message encryption/decryption module 370 is configured to encrypt and decrypt messages using an encryption/decryption algorithm and the shared secret 360.

Figure 4:
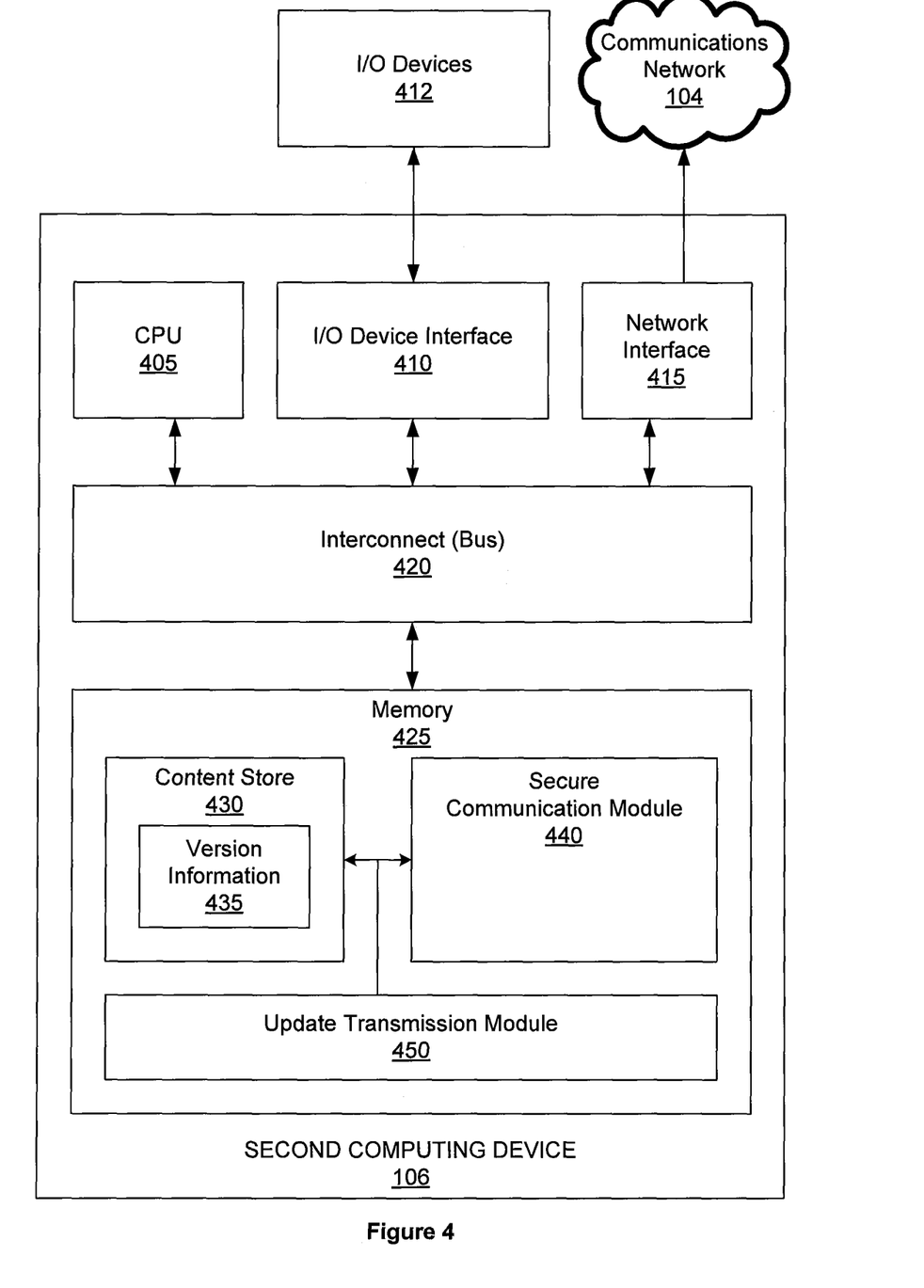
FIG. 4 is a more detailed illustration of the second computing device of FIG. 1, according to one embodiment of the present invention.

FIG. 4 is a more detailed illustration of the second computing device 106 of FIG. 1, according to one embodiment of the present invention. As shown, second computing device 106 includes a central processing unit (CPU) 405, a network interface 415, an interconnect 420, and a memory 425. The second computing device 106 may also include an input/output (I/O) device interface 410 connecting I/O devices 412 (e.g., keyboard, display, and mouse devices) to the second computing device 106.

As shown, the memory 425 includes a content store 430, a secure communication module 440, and an update transmission module 450. In one embodiment, the content store 430 is a media store configured to provide audio or video data to the content player 230 included in the first computing device 102. The secure communication module 440 includes software that, when executed, causes the second computing device 106 to engage in an encrypted communication with another computing device, such as the first computing device 102, via the communications network 104. The update transmission module 450 includes software that, when executed, causes the content store 430 and the secure communication module 440 to be updated and also causes the content player 230 and secure communication module 240 on the first computing device 102 to be updated.

As shown, the content store 430 includes version information 435. The version information 435 stores information representing the current version of the software of content player 430. In one embodiment, the content store 430 is configured to allow a content player 230 on the first computing device 102 to download content only if the version information 435 of the content store 430 corresponds to the version information 235 of the content player 230. In one embodiment, the version information 435 includes a version number. In another embodiment, the version information 435 includes the date and time when the software of a player associated with content store 430 was last modified.

In one embodiment, when the update transmission module 450 updates the secure communication module 440 and the content in the content store 430, the update transmission module 450 also provides software to the first computing device 102 to update both the content player 230 and the secure communication module 240. Such an update guarantees that the version information 435 of the content store 430 corresponds to the version information 235 of the content player of the first computing device 102. Furthermore, such an update guarantees that the values in the secret module 245 of the secure communication module 240 of the first computing device 102 correspond to the values in the secure communication module 440 of the second computing device 106.

Figure 5:
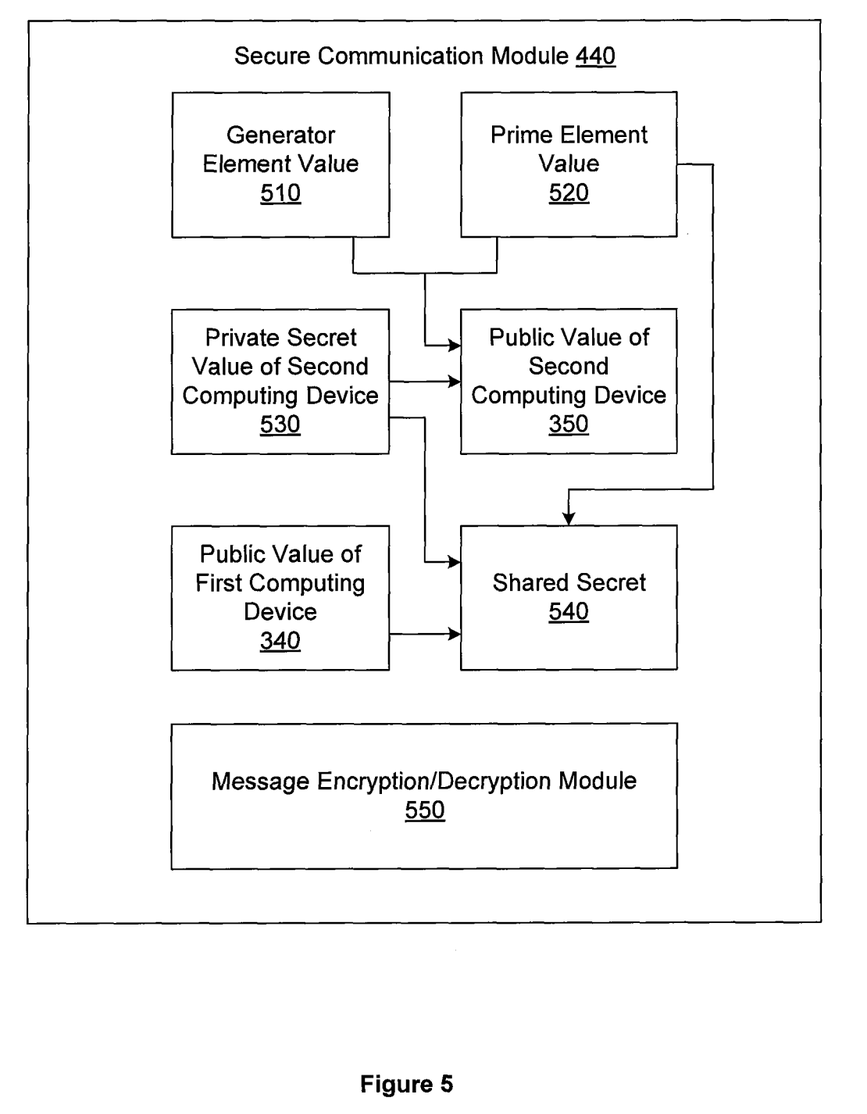
FIG. 5 is a more detailed illustration of the secure communication module in the second computing device of FIG. 4, according to one embodiment of the present invention.

FIG. 5 is a more detailed illustration of the secure communication module 440 in the second computing device of FIG. 4, according to one embodiment of the present invention. As shown, the secure communication module 440 includes a generator element value 510, a prime element value 520, a private secret value of second computing device 530, a public value of second computing device 350, a public value of first computing device 340, a shared secret 540, and a message encryption/decryption module 550. As would be apparent to one skilled in the art, in one embodiment, the secure communication module 440 of the second computing device 106 is different from the secure communication module of the first computing device 102 to the degree that the second computing device 106 lacks a secret module 245. Instead, generator element value 510 and prime element value 520 are stored in a non-secret module (not shown). One reason that a secret communication module may be required on the first computing device 102 but not on the second computing device 106 is that an end-user may have access to the first computing device 102, but not to the second computing device 106. In one embodiment, such a fact pattern applies when the first computing device 102 is a client computing device, such as a laptop or desktop computer or mobile phone operated by an end-user, and the second computing device 106 is a server machine in a content distribution network (CDN) belonging to a media content provider.

In one embodiment, the generator element value 510 and the prime element value 520 stored on the second computing device 106 are equal to the generator element value 310 and the prime element value 320 stored on the first computing device 102, respectively. Persons skilled in the art would recognize that the generator element value 510 and the prime element value 520 are needed to implement an encryption algorithm, such as the Diffie-Hellman key exchange algorithm, the ElGamal encryption algorithm, or the digital signature algorithm (DSA). In one embodiment the generator element value 510 and the prime element value 520 correspond to a particular version information 435 of the content store 430. In other words, whenever the version information 435 of content store 430 is updated, the generator element value 510 and prime element value 520 are also updated. Such a technique ensures that the generator element value 510 and prime element value 520 correspond to the version information 435. In one embodiment, the generator element value 510 is relatively prime to the prime element value 520. In one embodiment, the generator element value 510 is comprised of more bits than a first threshold number and has less than a second threshold number of bits that are set to 1 in order to facilitate binary calculations with the generator element value 510. In one embodiment, the prime element value 520 is larger than a third threshold number, such that the following values are difficult to guess by trial-and-error: prime element value 320, public value 350 and shared secret 540. However, persons skilled in the art would recognize that any generator element value 510 and prime element value 520 that is valid according to the encryption algorithm may be implemented in conjunction with the techniques described herein.

According to one embodiment, where the key exchange algorithm being implemented is the Diffie-Hellman key exchange algorithm, the private secret value of the second computing device 530 is selected by the secure communication module 440 to be a number between one and one less than the prime element value 520. As illustrated, the public value of the second computing device 350 is determined from the generator element value 510, the prime element value 520, and the private secret value of the second computing device 530. According to one embodiment, where the encryption algorithm being implemented is the Diffie-Hellman key exchange algorithm, the public value of the second computing device 350 is calculated according to Equation (3):

$$B = g^b \bmod p \qquad (3)$$

Where B is the public value of the second computing device 350, b is the private secret value of the second computing device 530, g is the generator element value 510, and p is the prime element value 520.

In one embodiment, the secure communication module 240 further stores the public value of the first computing device 340. In one embodiment, the public value of the first computing device 340 is received over the communications network 104 from the first computing device 102. In addition, in one embodiment, the secure communication module 440 further stores a shared secret 540. As illustrated, the shared secret 540 is calculated based on the prime element value 520, the private secret value of the second computing device 530, and the public value of the first computing device 340. According to one embodiment, where the key exchange algorithm being implemented is the Diffie-Hellman key exchange algorithm, the shared secret 540 is calculated according to Equation (4):

$$s = A^b \bmod p \qquad (4)$$

Where s is the shared secret 540, A is the public value of the first computing device 340, b is the private secret value of the second computing device 530, and p is the prime element value 520.

However, as persons skilled in the art would understand, cryptography algorithms other than Diffie-Hellman key exchange algorithm could be used in conjunction with the techniques described herein. If a cryptography algorithm other than Diffie-Hellman key exchange algorithm is used, then the formulas for calculating the public value of the second computing device 350 and the shared secret 540 would be different from Equations (3)-(4) set forth above.

The message encryption/decryption module 550 is configured to encrypt and decrypt messages using an encryption/decryption algorithm and the shared secret 540.

Figure 6:
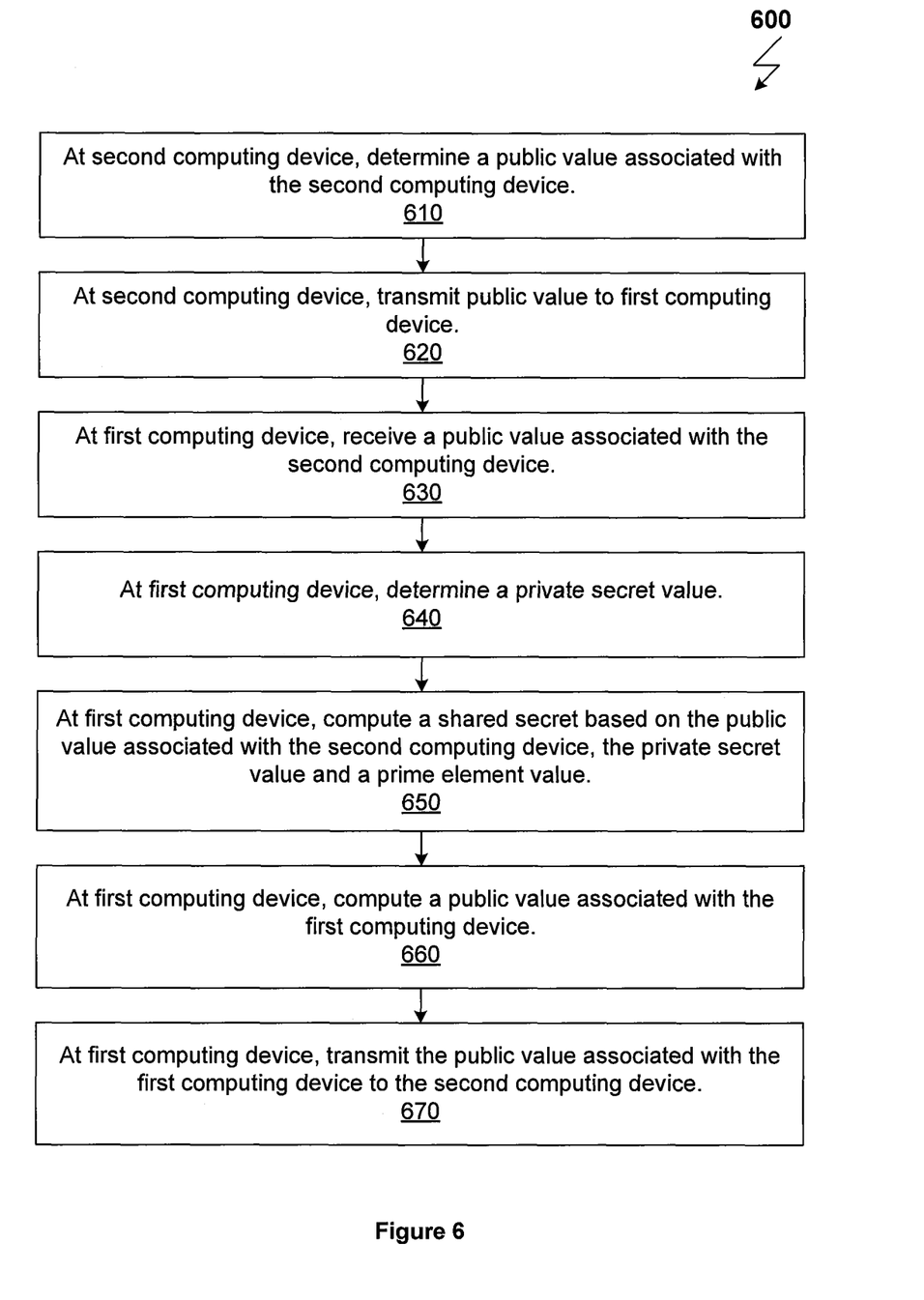
FIG. 6 is a flow diagram of method steps for computing a shared secret in an obfuscated manner, according to one embodiment of the present invention.

FIG. 6 is a flow diagram of method steps for computing a shared secret in an obfuscated manner, according to one embodiment of the present invention. Although the method steps are described in conjunction with FIGS. 1-5, persons skilled in the art will understand that any system configured to perform the method steps, in any order, falls within the scope of the present invention.

The method 600 begins at step 610 where the secure communication module 440 computes a public value of the second computing device 350 based on at least one initial setup value stored in the secure communication module 440, the private secret value 530, and an algorithm, such as the Diffie-Hellman key exchange algorithm, the ElGamal encryption algorithm, or the digital signature algorithm (DSA). In one embodiment, the key exchange algorithm is the Diffie-Hellman key exchange algorithm and the public value of the second computing device 350 is calculated according to equation (3), as set forth above. At step 620, the secure communication module 440 transmits the public value of the second computing device 350 to the secure communication module 240 of the first computing device 102. In one embodiment, the public value of the second computing device 350 is transmitted from the second computing device 106 over the communications network 104.

The method 600 then continues to step 630, where the secure communication module 240 receives the public value of the second computing device 350. At step 640, the secure communication module 240 computes a private secret value of the first computing device 330. In one embodiment, the private secret value of the first computing device 330 is between one and one less than the prime element value 320. In one embodiment, the calculation and storage of the private secret value of the first computing device 330 is obfuscated.

Next, the method 600 continues to step 650, where the secure communication module 240 determines a shared secret 360 based on the private secret value 330 and the public value of the second computing device 350 and the prime element value 320. In one embodiment, the key exchange algorithm is the Diffie-Hellman key exchange algorithm and the shared secret 360 is calculated according to equation (2), as set forth above. In one embodiment, the calculation of the shared secret value of the first computing device 360 is obfuscated.

At step 660, the secure communication module 240 computes the public value of the first computing device 340 based on the private secret value 330, the generator element value 310 and the prime element value 320. In one embodiment, the calculation of the public value of the first computing device 340 is obfuscated. At step 670, the secure communication module 240 transmits the public value of the first computing device 340 to the second computing device 106 via the communications network 104.

The secure communication module 440 of the second computing device 106 determines a shared secret 540 according to a process similar to the one described above in conjunction with FIG. 6. However, an important difference is that, according to one embodiment, in the secure communication module 440 of the second computing device 106, there is no secret module 245. The values corresponding to the values stored in the secret module 245 in the first computing device 102 are stored by secure communication module 440 in the second computing device 106.

Figure 7:
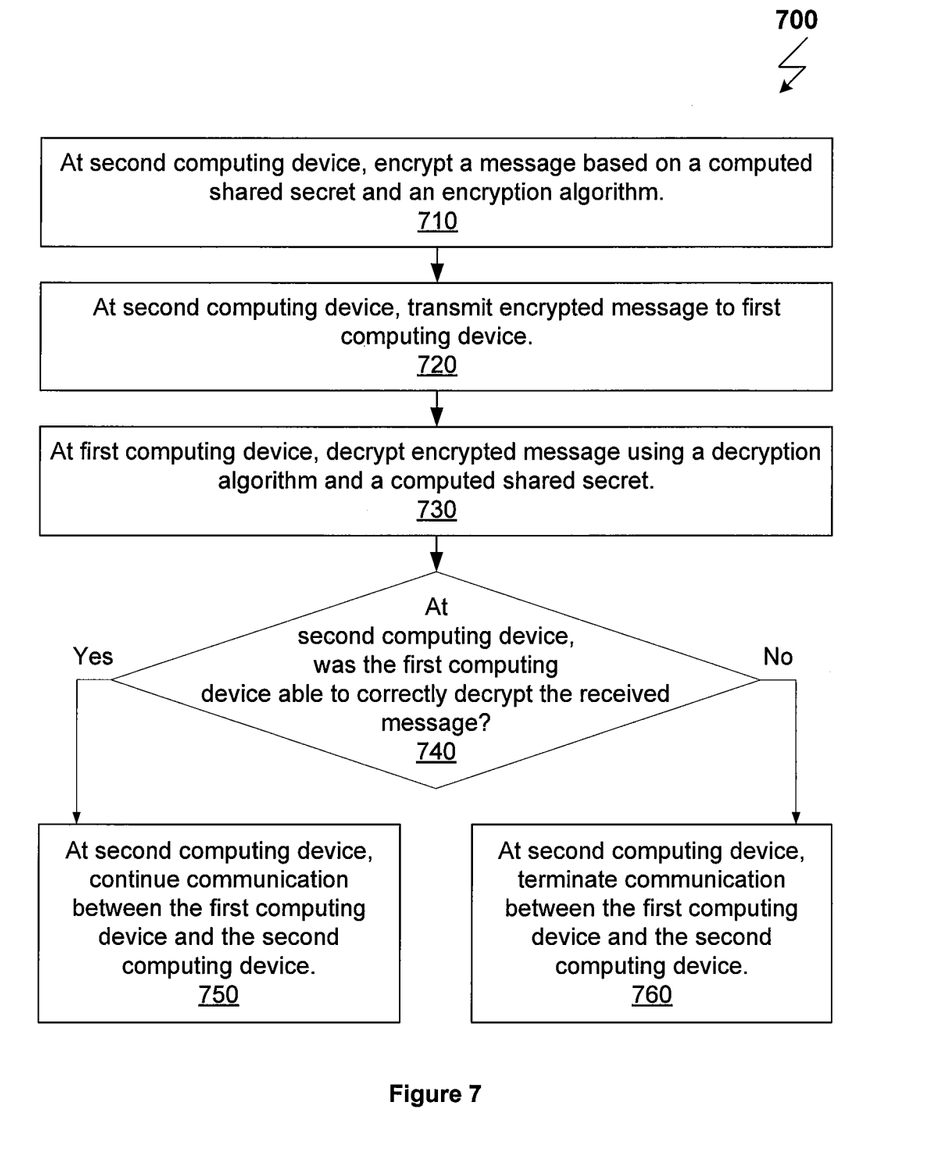
FIG. 7 is a flow diagram of method steps for verifying that the first computing device of FIG. 1 has the correct version of a content player application, according to one embodiment of the present invention.

FIG. 7 is a flow diagram of method steps for verifying that the first computing device of FIG. 1 has the correct version of a content player application, according to one embodiment of the present invention. Although the method steps are described in conjunction with FIGS. 1-5, persons skilled in the art will understand that any system configured to perform the method steps, in any order, falls within the scope of the present invention.

The method 700 begins at step 710, where the message encryption/decryption module 550 included in the secure communication module 440 of the second computing device 106 encrypts a message based on the previously-computed shared secret 540. At step 720, the message encryption/decryption module 550 transmits the encrypted message to the first computing device 102. At step 730, the message encryption/decryption module 370 included in the secure communication module 240 of first computing device 102 decrypts the encrypted message received from the second computing device 106 based on a decryption algorithm and the shared secret 360 computed via the technique described in FIG. 6.

At step 740, the message encryption/decryption module 550 determines whether the first computing device 102 correctly decrypted the message transmitted by the second computing device 106 at step 720. If the first computing device 102 correctly decrypted the message, then the method proceeds to step 750, where the communication between the first computing device 102 and the second computing device 106 continues. Importantly, if the shared secret 360 computed by the first computing device 102 is correct, then the first computing device 102 is able to correctly decrypt the message transmitted by the second computing device 106. However, if the first computing device 102 did not correctly decrypt the message, then the method proceeds to step 760, where the communication between the first computing device 102 and the second computing device 106 is terminated.

In one embodiment, the first computing device 102 uses the decrypted message as an input to a session key generating algorithm to generate a session key. The session key is then validated at step 740 by the second computing device 106 to determine if the first computing device 102 correctly decrypted the message.

In an alternative embodiment, the first computing device 102 and the second computing device 104 use the shared secret as an input to a session key generating algorithm to generate a session key. The session key is used to encrypt messages communicated between 102 and 104. The session key is then validated at step 740 by the second computing device 106 to determine if the first computing device 102 correctly decrypted the message.

In another embodiment, both the first computing device 102 and the second computing device 106 agree to the value of the message, and, if the decrypted message generated at the first computing device 102 does not match the value that was agreed upon, then the first computing device 102 did not correctly decrypt the message. In such an embodiment, the first computing device 102 transmits an error message to the second computing device 102 indicating that the decrypted message does not match the value that was agreed upon.

Persons skilled in the art would understand that the inventive aspects described herein could be applied to software program having different versions. In other words, any software program can replace the content player application 230 described herein.

Figure 8:
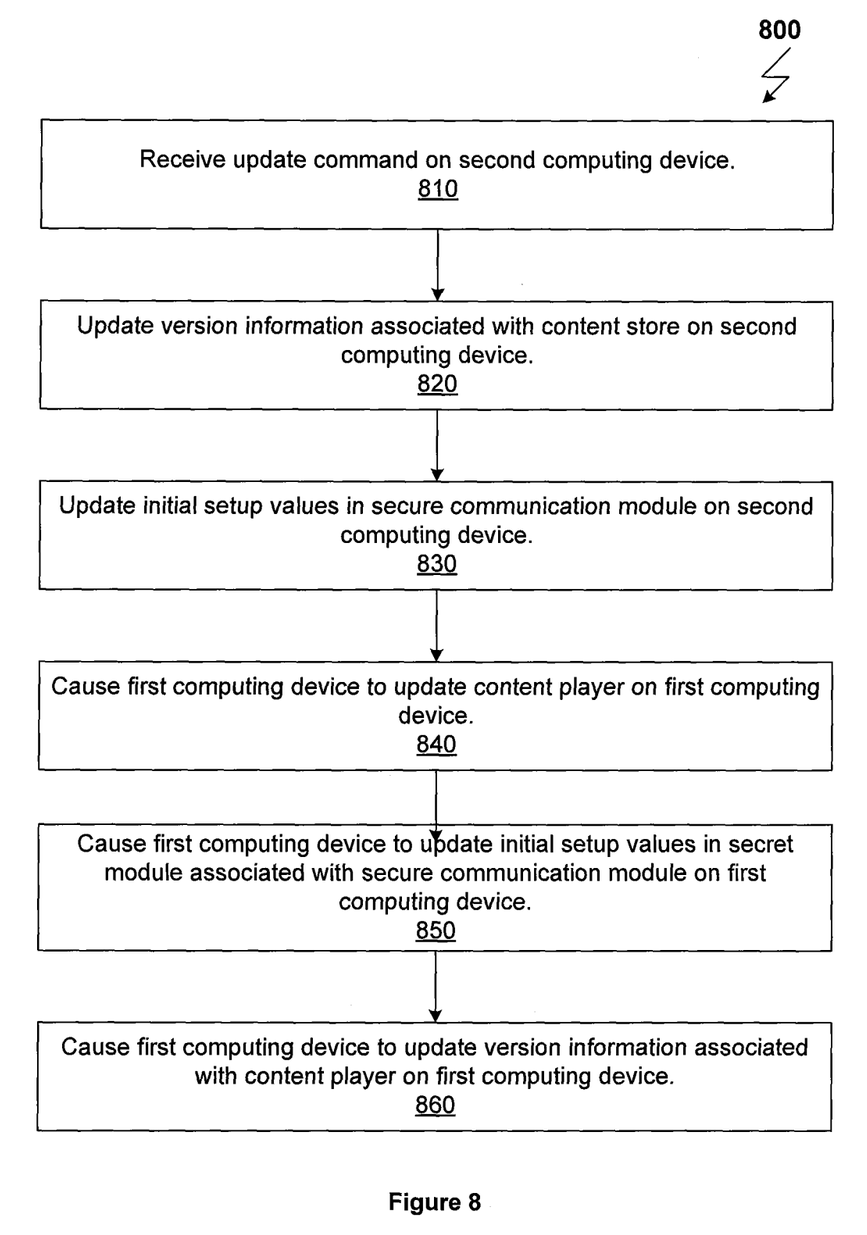
FIG. 8 is a flow diagram of method steps for updating the content player and the secure communication module in the first computing device of FIG. 1, according to one embodiment of the present invention.

FIG. 8 is a flow diagram of method steps for updating the content player 230 and the secure communication module 240 in the first computing device 102 of FIG. 1, according to one embodiment of the present invention. Although the method steps are described in conjunction with FIGS. 1-5, persons skilled in the art will understand that any system configured to perform the method steps, in any order, falls within the scope of the present invention.

The method 800 begins at step 810 where the update transmission module 450 of the second computing device 106 receives an update command. In one embodiment, the update command is provided by an administrator of the second computing device 106 when the administrator detects a security flaw in the software of the content player 230 on the first computing devices 102 and wishes to update this software. The method 800 then proceeds to step 820, where the update transmission module 450 updates the content store version information 435 and, if necessary, also updates the content store 430. Next, the method 800 proceeds to step 830, where the update transmission module 450 updates the initial setup values in the secure communication module 440 of the second computing device. In one embodiment, the updated transmission module 450 updates at least one of the generator element value 510 or the prime element value 520.

The method 800 then continues to step 840, where the update transmission module 450 causes the first computing device 102 to update the content player 230. In one embodiment, the update transmission module 450 communicates with the first computing device 102 via the communications network 104.

The method 800 then continues to step 850, where the update transmission module 450 causes the first computing device 102 to update the initial setup values, generator element 310 and prime element value 320, in the secret module 245 of the secure communications module 240. Finally, the method 800 continues to step 860, where the update transmission module 450 causes the first computing device 102 to update the content player version information 235 to reflect the update. After step 860, the method 800 ends.

In sum, the disclosed technique more broadly provides an encryption algorithm with obfuscated initial setup values, which ensures that only an approved version of communication software can successfully encrypt and decrypt messages. More specifically, according to one implementation of the technique, the cryptography algorithm is a Diffie-Hellman key exchange algorithm, and the initial setup values are the generator element value and the prime element value. According to this particular implementation, a client computing device downloads a current version of the communication software, which includes a generator element value and a prime element value for the encryption algorithm. Both the generator element value and the prime element value are stored within the client computing device in a secret or obfuscated module that cannot be read or accessed by the user of the client computing device.

To communicate with a server machine according to the Diffie-Hellman key exchange protocol, the client computing device generates a private secret value and a public value. The public value is calculated based on the private secret value, the generator element value, and the prime element value stored in the secret or obfuscated module. The client computing device then transmits the public value to the server machine. Upon receiving the public value from the server computing device, the client computing device computes a shared secret based on the private secret value of the client computing device, the public value of the server machine, and the prime element value stored in the secret or obfuscated module. Subsequent communications between the client computing device and the server machine are encrypted or decrypted based on the computed shared secret. In some implementations, the client computing device and the server machine also may verify that both have the same shared secret implicitly by being able to decrypt a message set between the client and the server.

One advantage of the disclosed approach is that a client computing device is able to download copyright media content only if the client computing device has a secure and approved version of the software for downloading and viewing such media. As a result, copyright media content providers can more easily ensure that only approved and secure media players are implemented to view the provided content.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The scope of the present invention is determined by the claims that follow.

What is claimed is:

1. A computer-implemented method for determining whether a first computing device has the correct version of a software program, the method comprising:
   computing a private secret value based on at least one initial setup value;
   computing a public value based on the private secret value and at least one initial setup value, wherein the at least one initial setup value comprises a base generator value or a prime element value, wherein a binary representation of the base generator value is comprised of more bits than a first threshold number and has less than a second threshold number of 1 bits;
   sending the public value to the second computing device;
   receiving a second public value from the second computing device;
   computing a shared secret based on the second public value received from the second computing device and the private secret value;
   receiving an encrypted message from the second computing device, wherein the encrypted message comprises an original message encrypted based on a shared secret computed by the second computing device;
   decrypting the encrypted message using the shared secret;
   determining whether the message was decrypted correctly; and
   if the message was decrypted correctly, causing communications between the first computing device and the second computing device to continue because the first computing device and the second computing device have the same version of the software program, wherein the message is decrypted correctly if (i) the decrypted message matches the original message and (ii) the shared secret computed based on the second public value received from the second computing device is equal to the shared secret computed by the second computing device; or
   if the message was not decrypted correctly, causing communications between the first computing device and the second computing device to terminate because the first computing device and the second computing device do not have the same version of the software program.

2. The method of claim 1, wherein the cryptography algorithm used to encrypt and decrypt the message comprises a Diffie-Hellman key exchange algorithm, an ElGamal encryption algorithm or a digital signature algorithm.

3. The method of claim 1, wherein a binary representation of the prime element value is comprised of more bits than a third threshold number.

4. The method of claim 1, wherein the second computing device determines whether the message was decrypted correctly and causes communications between the first computing device and the second computing device to continue or terminate.

5. The method of claim 1, wherein the computation of the private secret value, the public value and the shared secret by the first computing device is obfuscated.

6. The method of claim 1, wherein the software program comprises a content player application for receiving and displaying video data.

7. A non-transitory computer-readable medium storing instructions that, when executed by a processing unit, cause the processing unit to determine whether a first computing device has the correct version of a software program, by performing the steps of:
   computing a private secret value based on at least one initial setup value;
   computing a public value based on the private secret value and at least one initial setup value, wherein the at least one initial setup value comprises a base generator value or a prime element value, wherein a binary representation of the base generator value is comprised of more bits than a first threshold number and has less than a second threshold number of 1 bits;
   sending the public value to the second computing device;
   receiving a second public value from the second computing device;
   computing a shared secret based on the second public value received from the second computing device and the private secret value;
   receiving an encrypted message from the second computing device, wherein the encrypted message comprises an original message encrypted based on a shared secret computed by the second computing device;
   decrypting the encrypted message using the shared secret; and
   determining whether the message was decrypted correctly, wherein
   if the message was decrypted correctly, then communications between the first computing device and the second computing device continue because the first computing device and the second computing device have the same version of the software program, wherein the message is decrypted correctly if (i) the decrypted message matches the original message and (ii) the shared secret computed based on the second public value received from the second computing device is equal to the shared secret computed by the second computing device; or
   if the message was not decrypted correctly, then communications between the first computing device and the second computing device terminate because the first computing device and the second computing device do not have the same version of the software program.

8. The computer-readable medium of claim 7, wherein the cryptography algorithm used to encrypt and decrypt the message comprises a Diffie-Hellman key exchange algorithm, an ElGamal encryption algorithm or a digital signature algorithm.

9. The computer-readable medium of claim 7, wherein a binary representation of the prime element value is comprised of more bits than a third threshold number.

10. The computer-readable medium of claim 7, wherein the second computing device determines whether the message was decrypted correctly and causes communications between the first computing device and the second computing device to continue or terminate.

11. The computer-readable medium of claim 7, wherein the computation of the private secret value, the public value and the shared secret by the first computing device is obfuscated.

12. A first computing device, comprising:
   a processing unit configured to:
      compute a private secret value based on at least one initial setup value;

compute a public value based on the private secret value and on at least one initial setup value, wherein the at least one initial setup value comprises a base generator value or a prime element value, wherein a binary representation of the base generator value is comprised of more bits than a first threshold number and has less than a second threshold number of 1 bits;

send the public value to the second computing device;

receive a second public value from the second computing device;

compute a shared secret based on the second public value received from the second computing device and the private secret value;

receive an encrypted message from the second computing device, wherein the encrypted message comprises an original message encrypted based on a shared secret computed by the second computing device;

decrypt the encrypted message using the shared secret; and determine whether the message was decrypted correctly, wherein if the message was decrypted correctly, then communications between the first computing device and the second computing device continue because the first computing device has the correct version of a software program, wherein the message is decrypted correctly if (i) the decrypted message matches the original message and (ii) the shared secret computed based on the second public value received from the second computing device is equal to the shared secret computed by the second computing device, or if the message was not decrypted correctly, then communications between the first computing device and the second computing device terminate because the first computing device does not have the correct version of the software program.

\* \* \* \* \*